W. WEIS.
Egg-Carrier.

No. 168,692.

Patented Oct. 11, 1875.

WITNESSES:

INVENTOR:
W. Weis
BY
ATTORNEYS.

UNITED STATES PATENT OFFICE.

WENDELIN WEIS, OF ST. PAUL, MINNESOTA.

IMPROVEMENT IN EGG-CARRIERS.

Specification forming part of Letters Patent No. 168,692, dated October 11, 1875; application filed August 21, 1875.

*To all whom it may concern:*

Be it known that I, WENDELIN WEIS, of St. Paul, in the county of Ramsey and State of Minnesota, have invented a new and Improved Egg-Carrier, of which the following is a specification.

Figure 1:
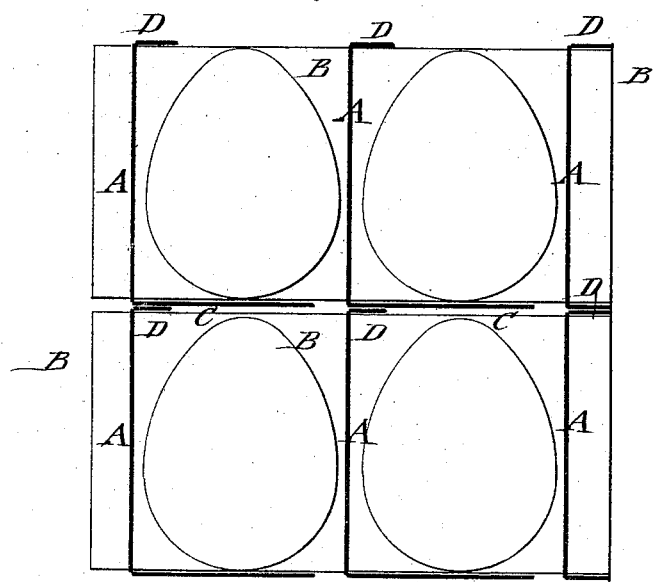
Figure 2:
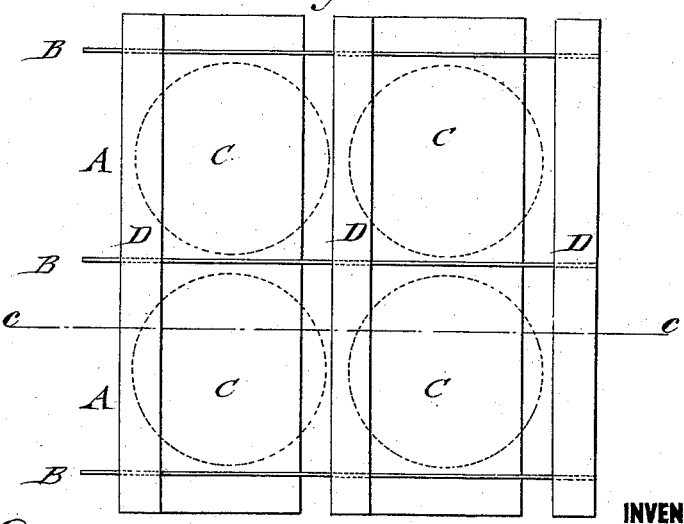

In the accompanying drawing, Figure 1 represents a vertical transverse section on the line *c c*, Fig. 2; and Fig. 2, a top view of my improved egg-carrier.

Similar letters of reference indicate corresponding parts.

The object of my invention is to so improve the partition-cells for egg-carriers that the separate and hinged covers or horizontal sheets which divide the trays may be dispensed with, and a more advantageous device substituted, by which the egg-cases are made cheaper and more durable.

The invention consists in providing the lateral partition-strips of the egg-cells with broader bottom and narrower top extension strips, that are creased and bent to form the cover or horizontal partitions for the trays.

In the drawing, A represents the lateral partition-strips, which interlock in any approved manner with the cross-strips B, forming the cells for the eggs. The strips A are extended at top and bottom, a broad extension-strip, C, of nearly the width of the cell, being formed at the bottom, and a narrower strip, D, along the top of the same. These extension-strips C and D are bent in the same direction to a level with the dividing cross-strips, being cut or creased at the angles to allow the easier bending of the extensions when placing the trays in position for the eggs, or when taking out the eggs. The broader bottom strips C form the bottom of the cells, and take the place of the separate covers or dividing-sheets heretofore employed. The upper strips D serve to strengthen the bottom strips of the adjoining tray above, in order to secure them against sagging when filled with eggs. The bottom strips of the lowermost tray form, furthermore, a lining for the bottom of the egg-case, so as to make the eggs less liable to break when transported. The open space between the edges of the bottom strip C and the next partition-strip A has the further advantage that any broken egg that has been placed in the case, or gets broken in the course of transportation, is allowed to drip down to the bottom of the case, leaving the trays in good condition without soaking through the covers or dividing-sheets, and destroying them thereby. The egg-carrier dispenses thus with the dividing-sheets of the trays, and supports the eggs in equally secure and neat manner as heretofore.

Having thus described my invention, I claim as new and desire to secure by Letters Patent—

In egg-carriers the broad lateral partition-strips, provided with bottom extension-strips of less width than the cell, and with narrow top extension-pieces to form supporting strips for the bottom strips of the adjoining trays above, substantially as and for the purpose set forth.

WENDELIN WEIS.

Witnesses:
FR. F. WILDE,
ED. S. COOMBS.